United States Patent [19]
McQueen

[11] 3,911,957
[45] Oct. 14, 1975

[54] SEAL
[76] Inventor: Malcolm M. McQueen, 19430 Marilla St., Northridge, Calif. 91324
[22] Filed: July 12, 1974
[21] Appl. No.: 487,859

Related U.S. Application Data
[63] Continuation-in-part of Ser. No. 280,481, Aug. 14, 1972, abandoned.

[52] U.S. Cl. .................. 137/625.48; 137/625.38 L
[51] Int. Cl.² ........................................ F16K 11/07
[58] Field of Search ....... 137/625.48, 625.6–625.69, 137/625.38; 29/157.1; 257/125, 63.5, 63.6; 277/153, 154; 285/111

[56] References Cited
UNITED STATES PATENTS

| | | | |
|---|---|---|---|
| 2,355,458 | 8/1944 | Mastenbrook | 137/625.38 X |
| 3,223,426 | 12/1965 | Reid | 277/153 |
| 3,238,821 | 3/1966 | Coulter | 137/625.6 X |
| 3,406,979 | 10/1968 | Weber | 277/164 X |
| 3,574,311 | 4/1971 | Fairbanks | 137/625.68 |
| 3,680,874 | 8/1972 | Schwarz | 285/111 X |
| 3,746,047 | 7/1973 | Peters | 137/625.66 |

FOREIGN PATENTS OR APPLICATIONS
1,506,181   11/1967   France .......................... 137/625.64

Primary Examiner—Henry T. Klinksiek
Attorney, Agent, or Firm—John J. Posta, Jr.

[57] ABSTRACT

An improved valve, particularly adapted for use as a slurry valve, which includes a generally cylindrical valve body in sliding engagement with a generally cylindrical valve housing containing an inlet and a pair of spaced outlets. Separate passageways through the valve body are provided between the inlet and the two outlets. The position of the valve body is controlled by a fluid or gaseous actuator device adjacent one end of the valve body and spring means adjacent the other end of said body. Bearing surfaces on said valve body carry novel O-rings protected from wear and abrasion by the housing wall and the location of a pair of axially short annular inlet and outlet apertures. The specific valve design permits over-travel of the valve body when moved between operative positions while maintaining full fluid flow therethrough and simultaneous sealing of the alternate passageway. The novel seal-valve combination affords long life of the combination and prevents wear of the seal in this support valve design.

9 Claims, 9 Drawing Figures

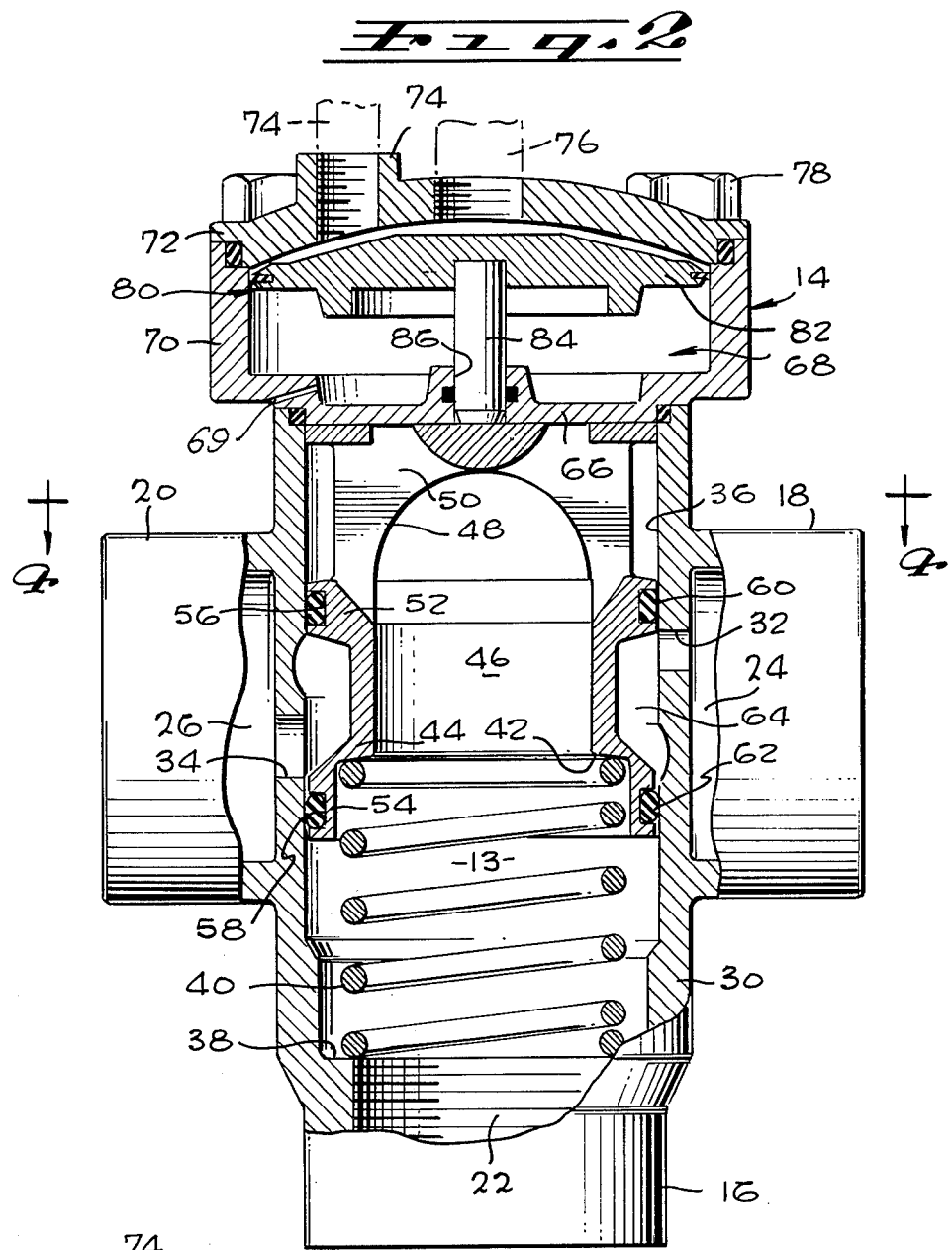
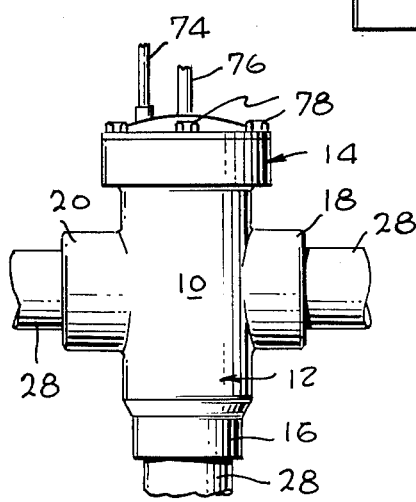

SEAL

CONTINUATION-IN-PART APPLICATION

This application is a continuation-in-part of U.S. Pat. application Ser. No. 280,481, filed Aug. 14, 1972, entitled "Improved Valve," now abandoned.

BACKGROUND OF THE INVENTION

A. Field of the Invention

The present invention generally relates to valves and more particularly to slurry valves of the diverter type.

B. Description of Prior Art

O-rings and the like resilient seal members in certain types of valves are normally exposed to debilitating environments during use of the valves. For example, O-rings may be exposed to high temperatures in fluid environments, which temperatures accentuate the corrosive effects of the fluids. Moreover, solids carried in the fluids may inpinge upon the exposed O-rings continuously, wearing away the O-rings surfaces and resulting in their dimensional distortion while adversely affecting their flexibility and lubricity. Accordingly, it is quite common in many valve applications to replace the O-rings at frequent intervals. This usually entails dismantling the valve after its removal from the system employing the same. Accordingly, a considerable expense is incurred by reason of system down-time and O-ring replacement costs. It would be desirable to provide a valve construction which would effectively protect O-rings and similar resilient seals from exposure to debilitating conditions during valve usage.

In prior art applications, well known O-rings have been employed. In the type of application shown here, the O-ring is moved from a sealing position, past open ports, to a second sealing position. When moving from the sealing position into the open port area, the ordinary O-rings expand outward. When moved further into sealing engagement, the O-ring is compressed, with a shearing action being encountered by the O-ring. This shearing action weakens the structural integrity of the seal causing deterioration thereof. Applicant provides herein a novel O-ring which inherently decreases the effects of the shearing action encountered, as noted above, thereby increasing seal life.

It would also be desirable to provide a valve which would incorporate means for effectively protecting its internal components from fouling with solids carried by the fluid which are too large to pass through the valve without fouling it. Valve plugging involves a safety hazard and also entails a considerable expense due to system down-time and repair and maintenance charges.

Moreover, many valves include means for moving the valve body in its housing between a plurality of positions, with attendant use of devices to indicate the respective positions of the valve body. Most such devices utilize precision control means of a relatively expensive and complicated nature to assure a true indication of attainment of full flow-through or zero flow-through, i.e., a "full open" or "full closed" position. A valve constructed in a manner which permits a simple, inexpensive yet fully effective valve-position indicator would be highly desirable from an initial and also an operating and maintenance standpoint.

The valve of the present invention satisfies all of the aforesaid needs.

SUMMARY OF THE INVENTION

The invention is substantially as described in the abstract above. In this regard, an improved valve is provided which permits easy removal of entrained solids too large to safely or conveniently pass through the valve body. The valve also includes a novel O-ring and means effectively protecting the O-rings thereof against deterioration and also incorporates components which permit over-travel of the valve body between operative positions while still effectively controlling fluid flow so that simple, economical valve-moving and indexing means can be used in the valve construction.

The improved valve includes a housing having an inlet and a pair of spaced outlets, a valve body slideably received within the housing, resilient seating means in the form of a coil spring or the like and control and biasing means in the form of a pressure chamber and piston. The spring biases the valve body to a first position wherein communication between the inlet and a first outlet is provided. The pressure chamber and piston are employed to move the valve body from the aforesaid first position to a second position wherein communication between the inlet and a second outlet is provided through the valve body. The valve body is provided with a central longitudinal passageway and a first annular passageway communicating therewith.

A second annular passageway is also provided between a pair of spaced annular members having bearing surfaces containing peripheral grooves within which are disposed novel O-rings. These O-rings are constructed so as to have a resilient member imbedded therein which prevents expansion of the O-ring in its circumferential dimension when it passes into an open port position. Relatively axially short inlet and first outlet apertures communicate with relatively large apertures associated with the respective inlet and outlet so that entrained solids cannot pass through the housing wall and into the valve body. Such short apertures also have the advantage of allowing the O-rings to be exposed to the fluid passing through the valve only for a brief period of time, i.e., when the valve body moves between the described first and second positions. Otherwise, the O-rings are substantially fully covered by the adjacent housing wall and the side walls of the grooves located in the valve body members.

The arrangement of the spring, valve body and the piston are such that the valve body can travel past an initial position which permits full fluid flow through the valve body and out the second outlet and still maintain full fluid flow therethrough. Accordingly, fully precise valve indexing is not required to effect the desired mode of valve operation and positive sealing of the alternate passageway.

BRIEF DESCRIPTION OF THE DRAWINGS

FIG. 1 is a side elevation of a preferred embodiment of the valve of the invention.

FIG. 2 is an enlarged vertical section of the valve of FIG. 1 depicting the valve in a first position permitting full fluid flow from a first outlet.

DESCRIPTION OF THE PREFERRED EMBODIMENT

Figure 3:
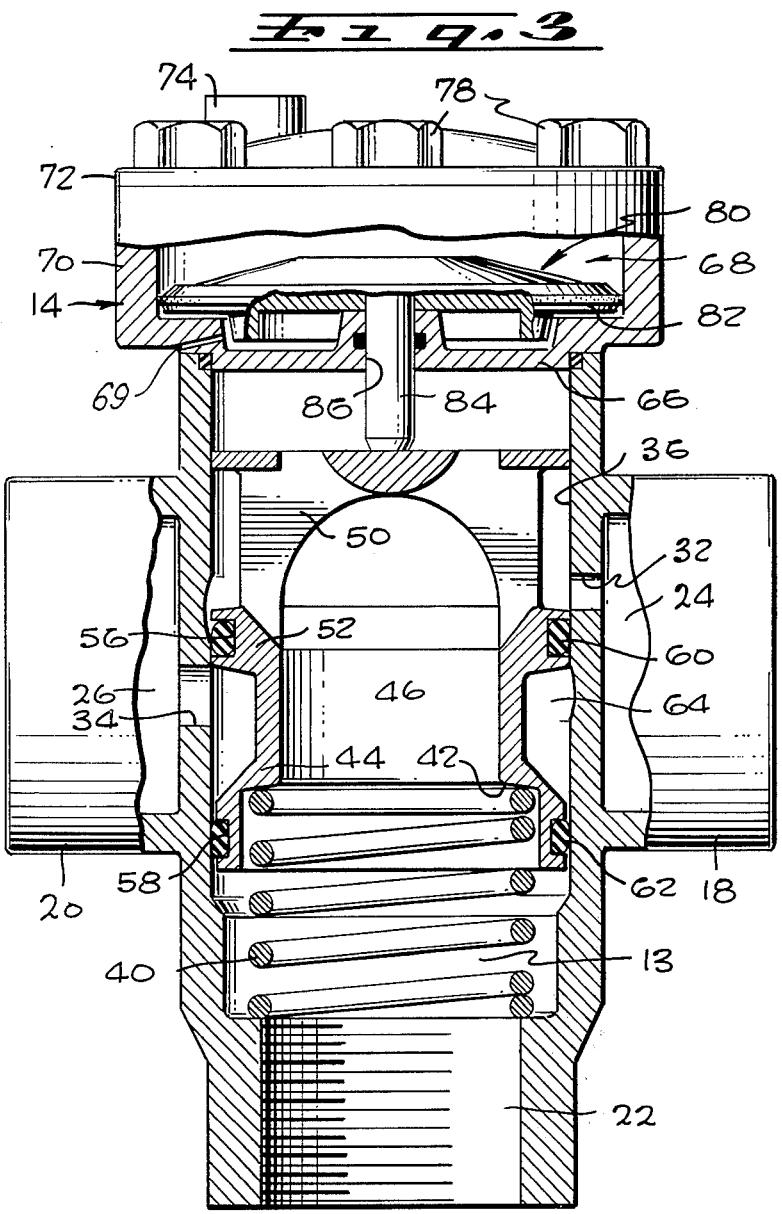
FIG. 3 is an enlarged vertical section of the valve of FIG. 1 depicting the valve body in a second position permitting full fluid flow from a second outlet.
Figure 4:
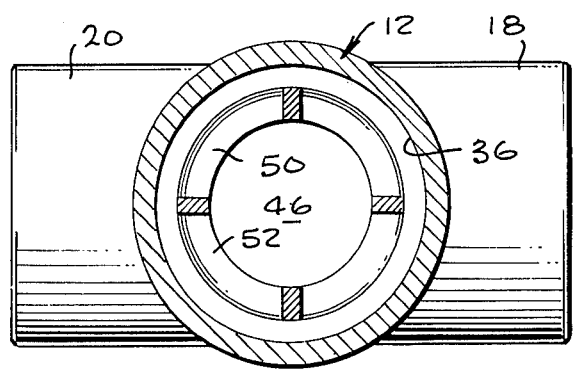
FIG. 4 is a horizontal section taken along the section line 3—3 of FIG. 2.

A preferred embodiment of the improved valve of the invention is shown in side elevation in FIG. 1. The valve 10 includes a generally cylindrical housing 12 having a hollow central bore 13, a closed top portion 14, an open bottom portion 16 and two open transversely extending portions 18 and 20. Each of portions 16, 18 and 20 defines a relatively large aperture 22, 24 and 26, respectively, forming a fluid inlet (portion 18) and first (portion 20) and second (portion 16) fluid outlets. The inlet and outlets are internally threaded and, as shown in FIG. 1, receive suitable conduits 28.

The generally cylindrical vertical wall 30 of housing 12 defines bore 13 and has an axially short annular inlet aperture 32 located therein which provides communication between said bore and aperture 24. Aperture 32 preferably is located adjacent the upper portion of aperture 24, as shown in FIG. 2. Wall 30 also has an axially short annular outlet aperture 34 located therein which provides communication between the bore 13 and large outlet aperture 26, as also shown in FIG. 2. The function of the inlet aperture 32 of relatively reduced size is to prevent the passage of large entrained solid particles in fluid entering aperture 24 from passing into bore 13 thereby fouling operation and the internal components of valve 10. When aperture 32 is placed well above the lower end of aperture 24, heavier solids in fluid in aperture 24 can settle to the bottom of inlet portion 18 without passing through aperture 32 or blocking the entrance of aperture 32. Such settled solids can be easily removed from valve 10 by uncoupling piping 28 from portion 18 and cleaning out aperture 24 rather than dismantling the entire valve 10 and cleaning the internal components.

Wall 30 has a internal surface 36, the bottom portion of which is configured to provide an annular shoulder 38 upon which is seated (as shown in FIG. 2) valve seating means in the form of a coiled spring 40. The upper end of spring 40 bears against a downwardly directed annular shoulder 42 at the lower end of valve body 44 disposed in sliding engagement within bore 13 and generally cylindrical in configuration. Other methods can be employed to bias valve body 44 upwardly, as, for example, by placing spring 40 about pusher rod 84 between disc 82 and wall 66. Body 44 has a central longitudinally extending passageway 46 communicating with the second fluid outlet (portion 16). Body 44 is also provided adjacent its upper end with a valve cage portion 48 bearing a first annular passageway 50 in communication with passageway 46.

Body 44 also includes a pair of spaced annular members 52 and 54 with bearing surfaces contacting the inner surface 36 of wall 30. An annular groove 56 is provided in member 52 and a similar annular groove 58 is provided in member 54. Within each groove is disposed an O-ring (designated 60 in groove 56 and 62 in groove 58). Each such O-ring is in sliding sealing engagement with surface 36.

A second annular passageway 64 is defined between annular members 52 and 54. The O-rings 60 and 62 seal off passageway 64 from portions of valve 10 below or above the O-rings, while first annular passageway 50 is similarly sealed off by the upper O-ring 60 and by the bottom wall 66 of a hollow pressure chamber 61 secured in the top portion 14 of housing 12 at the upper end of wall 30, as shown in FIG. 2. Chamber 68 also includes suitable seals and gaskets, a side wall 70 and a top cover 72. A pressure inlet port 74 and a pressure outlet port 76 are located in cover 72, which, in turn, is releasably secured to side wall 70 by bolts 78.

A piston 80 comprising a transversely extending disc 82 with depending pusher rod 84 is disposed in sliding engagement in chamber 68 with rod 84 extending down through an aperture 86 in wall 66 into contact with the top of cage 48. Application of pressure to plate 82 through inlet 74 forces plate 82 and rod 84 down from the position shown in FIG. 2 to that illustrated in FIG. 3.

It will be noted from FIG. 2, that when valve body 44 is at rest, i.e., seated on spring 40 with no downward biasing applied thereagainst by piston 80, passageway 64 is in communication with aperture 32 (and thus inlet aperture 24) and also with aperture 34 and first outlet aperture 26 so that fluid flows from the inlet, through the valve and out the first outlet. It will also be noted that when valve body 44 is in the position of FIG. 2, aperture 32 is sealed off from passageway 50 and outlet portion 16 by O-rings 60 and 62.

When piston 80 biases body 44 down against spring 40 into the position shown in FIG. 3, passageway 64 is sealed off from aperture 32 by O-ring 60 so that fluid does not flow therethrough and out the first outlet portion 20. Instead, aperture 32 is now exposed to first passageway 50 so that fluid flows from the inlet through passageway 50 and passageway 46 and out the second outlet (portion 16).

An important feature of the invention is that O-rings 60 and 62 are protected from abrasion, corrosion, swelling and other deterioration by the adjacent surface 36 of wall 30 and by the surrounding portions of annular members 52 and 54 when valve 10 is being used in either the position shown in FIG. 2 or that shown in FIG. 3. It is only when the O-ring 60 is moving with body 44 from one of the two positions to the other that the O-ring is momentarily exposed to fluid in aperture 32. Accordingly, O-rings 60 and 62 are well protected during the great bulk of the usage of valve 10.

A further feature of the invention is the design of grooves 56 and 58 in which O-rings 60 and 62 reside. When those rings are exposed momentarily to fluid during movement of valve body 44 to the described positions, fluid flow is against the O-rings to force them into grooves 56 and 58 and keep them firmly seated therein, rather than forcing dislodgment thereof.

It will also be noted that inasmuch as the axial dimension of aperture 32 is relatively small and passageway 50 extends for a substantial portion of the length of body 44, body 44 can be urged downward by piston 80 well past the point at which full fluid flow through aperture 32 into passageway 50 occurs while still maintaining such full fluid flow and sealing of passage 64. This feature permits the use of a simple, inexpensive easily controlled and maintained valve body-positioning, indexing and indicating systems, rather than complicated and expensive precise mechanisms, which are generally required in comparable conventional valve systems, if one is to have any significant degree of certainty in determining whether flow is being maintained between the inlet and either or both outlets.

A like property is also incorporated for flow and sealing in the alternate position shown in FIG. 2.

Figure 5:
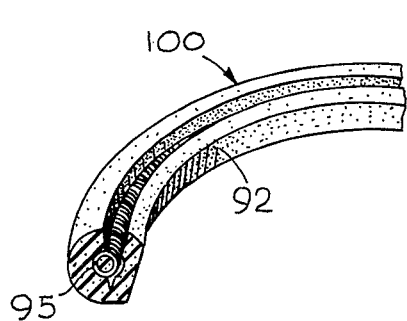
FIG. 5 is a partial perspective view of the seal.
Figure 6:
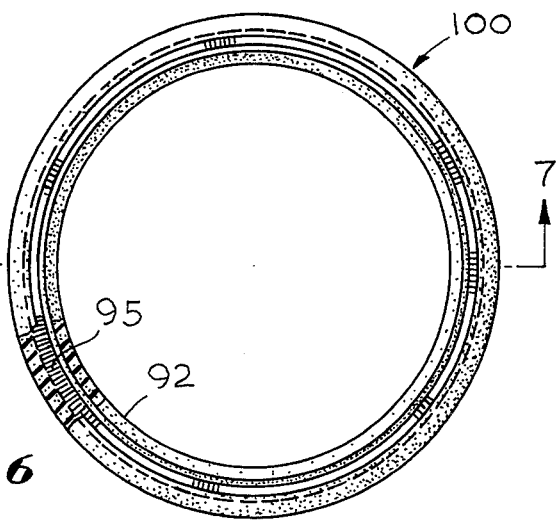
FIG. 6 is a plan view of the seal.

FIG. 5 is a partial perspective drawing of the composite O-ring seal; while FIG. 6 is a plan view of the seal. By reference to FIG. 7, we can clearly see a spring 95, shown in FIG. 5, imbedded along the inner core of seal 100. The seal 100 is essentially made of a flexible rubber 92, or equivalent flexible material with the spring 95, imbedded and bonded therein.

One method of manufacturing the seal 100 is disclosed in U.S. Pat. No. 3,813,105, the inventor of which is the same as in the instant application.

Figure 7:
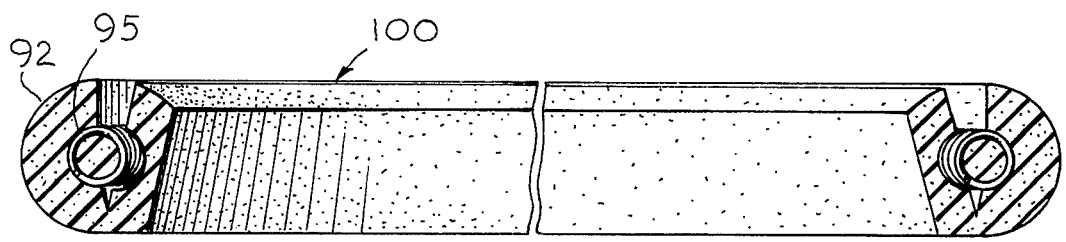
FIG. 7 is a cross-section of the seal taken along lines 7—7 of FIG. 6.
Figure 8:
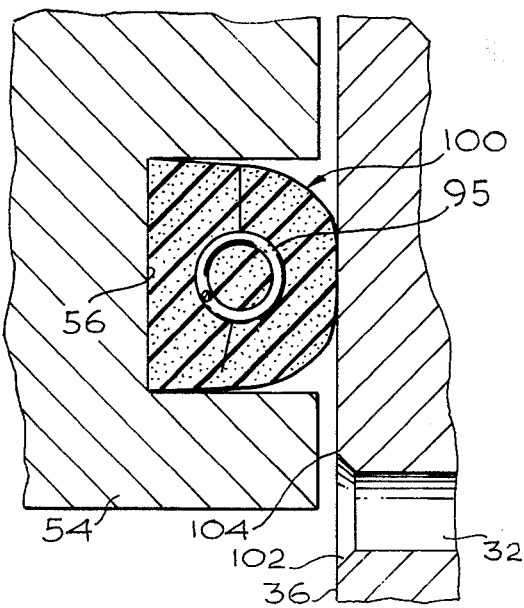
FIG. 8 is a cross-section of the spool member with the seal located in a groove therein and in sealing engagement with the interior surface of the valve.

FIG. 7 shows the seal 100 in its inoperative state, while FIG. 8 shows the seal in place in a groove 56 extending about a member 54, with the seal 100 not being subject to any extreme environment. The member 54 is in sliding contact with the inside surface 6. The surface 6 has an aperture 34 in communication with passageway 46, and, in this application, the seal 100 encircling member 52 is designed to be moved across aperture 32 when in operation. The aperture 32 can be provided with a beveled edge at 102 to reduce wearing of the seal 100 when moving past the aperture 34.

Since the inner surface 36 exerts a slight deforming pressure on seal 100, it is apparent that when the seal 100 reaches aperture 34, it will slightly protrude into aperture 34. On returning to its original position, this protruding section will abut against the edge 104 of aperture 32, producing a shearing action on seal 100. In friendly environments, this small protrusion of the seal and the attendant shearing action do not present a great problem due in part to the inherent flexible nature of the seal 100. This is not true when the seal is placed in a hostile environment.

In many applications, the seal may be subjected to a fluid medium having a temperature sufficiently high so as to enable the medium to permeate into the seal, causing swelling, and in any event, causing expansion of the seal material because of the higher temperature. An increase in the volumetric displacement of the seal is also caused by excessive heat generated by the friction between the seal 100 and inner surface 36 where the frequency of relative displacement therebetween is significant. Similarly, pressure loads on the seal can cause the seal to be forced out of its groove and thereby to be damaged on actuation.

Figure 9:
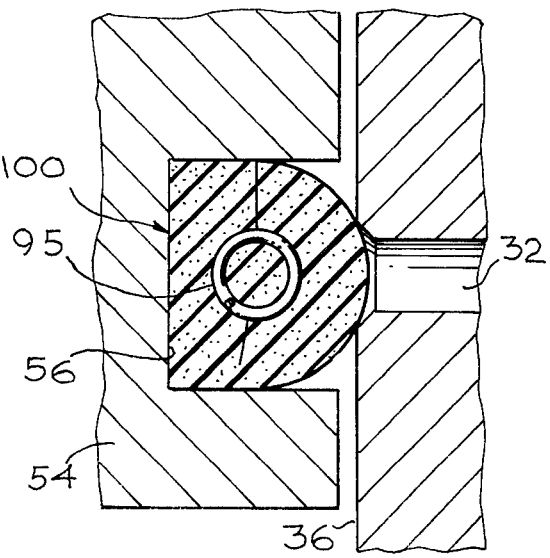
FIG. 9 is a cross-section of the spool member with the seal located in a groove therein and positioned opposite the port.

When subjected to such volumetric expansion or distortion forces, the seal 100 will attempt to grow both perpendicular to its outer surface, as well as along the circumferential length thereof. Expansion would normally take place in this manner in ordinary O-rings, but not so in Applicant's ring seal 100. Since the spring 100 has a lower coefficient of thermal expansion and high rigidity, the spring 95, being imbedded within the composite seal 100, will remain relatively rigid in such environmental extremes, thereby resisting and containing circumferential elongation of seal 100. Since the expanded material 92 must go somewhere, it moves perpendicular to the surface of seal 100 into the vacant area of groove 56. The seal 100 in FIG. 9 is in an extreme environmental condition and is positioned over aperture 32 in surface 36, but the seal has not significantly expanded into the aperture 32, due to the retentive forces of imbedded spring 95.

It is now apparent how the composite seal resists the spiral fracture hereinabove referred to. The presence of the imbedded spring with its increased resistance to torsional stress and shear failure (relative to rubber) results in a longer operational life.

It is apparent that various types of flexible materials other than rubber can be employed in the manufacture of the seal. The specific material chosen would depend upon particular design considerations. Likewise the inner core member can be made of metallic or other members either having the shape of a spring or other physical shapes. The primary requirement of the inner core member is to have a coefficient of expansion different from the flexible material and a higher modulus of elasticity so as to maintain the circumferential length of the seal in varying environmental and service conditions. Furthermore, the particular type of mold or other manufacture employed would also be dictated by specific design considerations.

The specific shape of the seal formed to take advantage of the invention can also be readily varied in an obvious way dictated by specific desired design considerations or manufacturing requirements. The seal can take the shape of a ring having a circular cross-section with the spring imbedded in the center.

What is claimed and desired to be secured by Letters Patent is:

1. An improved valve, comprising, in combination,
a housing having a closed end and a wall defining a hollow central bore, and an inlet and first and second outlets communicating with said bore, said inlet being located above said first and second outlets
a valve body in said bore disposed in sliding engagement with said wall, said valve body including:
a generally central longitudinally extending passageway communicating with said second outlet,
a cage portion forming part of said valve body and located adjacent one end thereof and defining a first annular passageway communicating with said central passageway,
a pair of spaced annular members with bearing surfaces contacting the inner surface of said wall, each of said members including an annular groove, and
a second annular passageway between said spaced members and in communication with said first outlet,
a resilient seat member seated within said valve body at the end thereof opposite said cage portion and positioning said valve body into a first position for communication of said inlet with said second annular passageway,
biasing means connected in sealing engagement with said housing adjacent the cage end of said valve body, for controllably biasing said valve body against said seat member into a second position for communication of said inlet with said first annular passageway, and
a pair of O-rings, each O-ring being disposed in one of said annular grooves and in sliding engagement with said wall, said O-rings being out of contact with said inlet and outlets when said valve body is in either of said first and second positions.

2. The improved valve of claim 1 wherein said valve is a slurry valve, and wherein said housing and said valve body are each generally cylindrical and said wall has a smooth inner surface.

3. The improved valve of claim 2 wherein said inlet includes a peripherally extending member defining a inlet aperture and wherein said wall in the region adjacent said inlet aperture defines an annular aperture smaller in size than said inlet aperture in communication therewith, whereby entrained solids in a slurry passing into said inlet aperture are trapped in said peripherally extending member and do not pass through said annular aperture.

4. The improved slurry valve of claim 3 wherein said annular aperture is positioned adjacent the upper end of said inlet aperture to facilitate said trapping and to prevent clogging of the small aperture.

5. The improved slurry valve of claim 4 wherein said valve body can travel past said second position while maintaining full open communication between said inlet and said first annular passageway.

6. The improved slurry valve of claim 5 wherein said resilient seat member comprises a coiled spring, wherein said biasing means includes a sealed pressure chamber with pressure inlet and outlet and wherein a piston extends through said chamber into contact with said cage member for controllably positioning said valve body to said first and second positions.

7. The improved slurry valve of claim 6 wherein said 0-rings are composite seals of two different materials comprising flexible material having an annular member imbedded therein, wherein the coefficient of expansion of said flexible material and said annular member are dissimilar.

8. The improved slurry valve of claim 7 wherein said annular member is a spring.

9. The improved slurry valve of claim 8 wherein said annular member is in the form of a closed ring.

* * * * *